Jan. 17, 1961 H. THRELFALL 2,968,080
JIG FOR A POTTER'S WHEEL
Filed Aug. 18, 1959
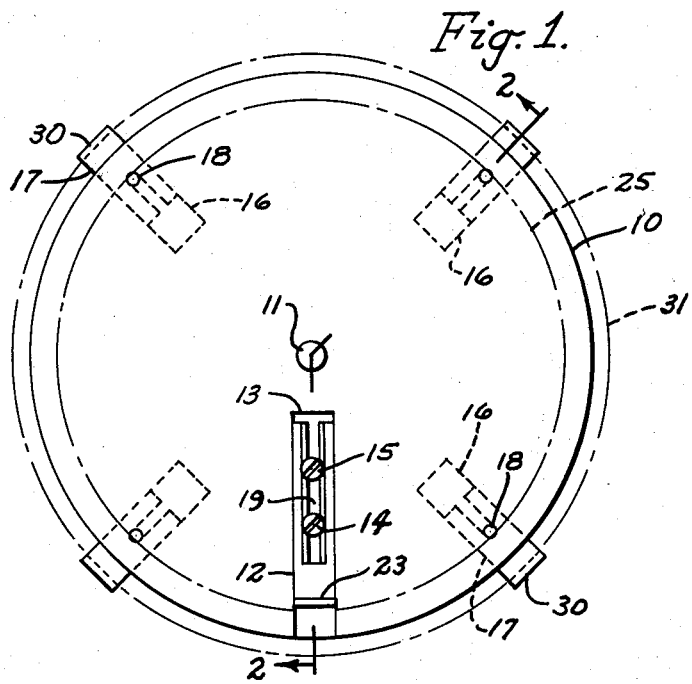
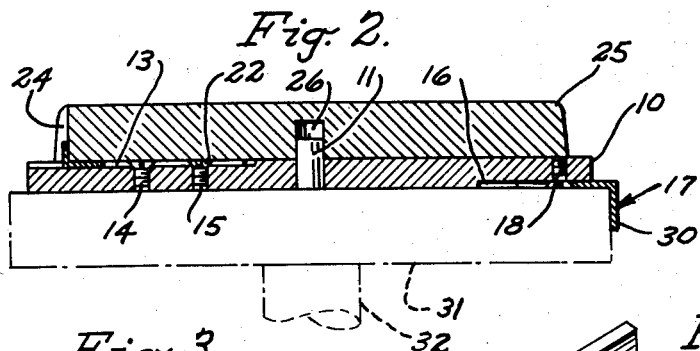
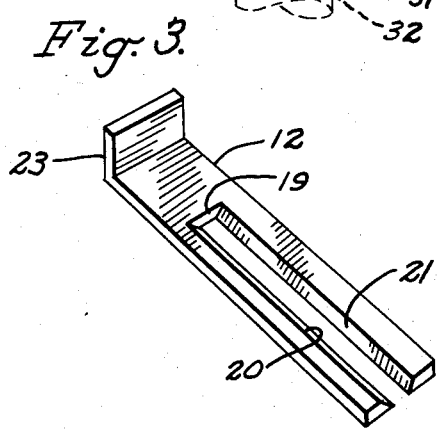
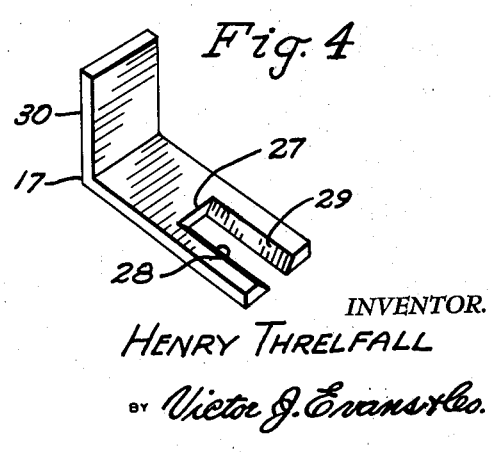
INVENTOR.
HENRY THRELFALL
BY *Victor J. Evans & Co.*
ATTORNEYS United States Patent Office 2,968,080
Patented Jan. 17, 1961

2,968,080
JIG FOR A POTTER'S WHEEL
Henry Threlfall, 3235 W. Carlisle St., Philadelphia, Pa.
Filed Aug. 18, 1959, Ser. No. 834,579
5 Claims. (Cl. 25—24)

This invention relates to the manufacture of pottery, and in particular a jig for a potter's wheel wherein a batt may be accurately positioned on the wheel and wherein the batt may be removed and replaced without changing the position thereof in relation to the center of the wheel.

The purpose of the jig is to carry a batt, with or without work positioned thereon, and to permit the removal, interchange and replacement of the batt on the wheel without making adjustments in the jig whereby the batt and work thereon are centered in relation to the wheel as originally started.

A potter's wheel consists, primarily, of a round plate, positioned horizontally and attached to the end of a shaft by which the wheel is rotated by a power source. Batts are familiar to ceramic and pottery workers. The batt is formed of plaster of Paris and casts in anything similar to a pie tin. A batt is accurately centered on a potter's wheel and clay and other materials are worked thereon. However, once the batt is removed it is substantially impossible to return it to the exact position to which it was originally adjusted. With this thought in mind this invention contemplates a jig positioned on a potter's wheel and having a centering pin and locating clamp whereby a batt accurately centered on the jig may be removed, set aside, making it possible to use another batt on the jig or wheel, and replaced with the batt accurately centered in relation to the wheel.

The object of this invention is, therefore, to provide a jig for positioning a batt on a potter's wheel in which clamps are provided for positioning the jig on a potter's wheel and a bracket is provided for co-acting with a pin for positioning a batt on the jig.

Another object of the invention is to provide a jig for a potter's wheel in which the parts are adjustable so that the jig may be used on wheels of different sizes.

A further object of the invention is to provid a jig for a potter's wheel whereby batts are accurately positioned on the wheel in which the jig is of a simple and economical construction.

With these and other objects and advantages in view the invention embodies a disc having a center pin extended upwardly from the upper surface, a bracket slidably mounted in an elongated slot in the upper surface and extended from the periphery toward the center, and a plurality of clamps slidably mounted in radially disposed slots in the under surface and positioned to extend over the edge of a potter's wheel on which the jig is positioned.

Other features and advantages of the invention will appear from the following description taken in connection with the drawing, wherein:

Figure 1 is a plan view showing the jig positioned on a potter's wheel and having a batt on the upper surface thereof.

Figure 2 is a cross-section through the assembly shown in Figure 1 taken on line 2—2 thereof showing the brackets for locating the batt on the jig and also one of the clips or clamps for locating the jig on the wheel.

Figure 3 is a view showing the bracket for locating a batt on a jig.

Figure 4 is a view showing one of the clamps or clips for locating the jig on a potter's wheel.

Referring now to the drawing wherein like reference characters denote corresponding parts the jig for potter's wheels of this invention includes a disc 10 having a pin 11 mounted in and extended upwardly from the center with an L-shaped bracket 12 slidably mounted in a slot 13 extended inwardly from the periphery toward the center in the upper surface, and secured in position by screws 14 and 15, and with radially disposed slots 16 in the under surface and in which L-shaped clamps 17 ar secured by screws 18.

The bracket 12 is provided with an elongated slot 19 having beveled edges 20 and 21 and the screws 14 and 15 are provided with frustro-conical-shaped heads 22 whereby flat upper surfaces of the heads are flush with the upper surfaces of the bracket and disc. The end of the bracket 12 is provided with a flange 23 and the position of the bracket is adjusted whereby the flange is positioned in a notch 24 in the periphery of a batt 25 with an opening 26 in the center of the batt positioned over the pin 11.

The clips 17 are provided with elongated slots 27 having beveled edges 28 and 29 and the ends of the clips are provided with flanges 30 that extend over the periphery of a potter's wheel 31, as shown in Figure 2. The screws 18 are also provided with frustro-conical-shaped heads that nest in the slots 27 and the flat surfaces of the heads are flush with the lower surfaces of the clips 17 and disc 10.

A potter's wheel is provided with a head and the head is mounted on the end of a shaft, such as the shaft 32 and upon rotation of the shaft by a suitable power source the head or wheel is rotated.

The disc 10 of the jig is accurately positioned on the wheel 30 and the clips 17 set to engage the periphery of the wheel; however, it is not absolutely necessary to center the jig or pin 11 in relation to the potter's wheel because upon rotation of the batt material thereon finds its own center, being worked at the periphery. With the jig remaining in position the batt may be removed and replaced and work carried by the batt will return to the same center.

Originally, the clips and brackets are accurately positioned and these parts are secured to the jig by the screws. Once the parts are accurately positioned it is not necessary to make adjustments each time the batt is returned to the jig.

It will be understood that modifications, within the scope of the appended claims, may be made in the design and arrangement of the parts without departing from the spirit of the invention.

What is claimed is:

1. A jig comprising a disc having a pin extended upwardly from the upper surface and positioned on the center thereof, an L-shaped bracket slidably mounted in a slot in the upper surface of the disc, and a plurality of clips slidably mounted in radially disposed slots in the under surface of the disc.

2. A jig for a potter's wheel comprising a disc having a pin extended upwardly from the center thereof with radially disposed slots in the under surface and with a slot extended from the periphery toward the center in the upper surface, L-shaped clips adjustably mounted in the slots in the under surface, and an L-shaped bracket adjustably mounted in the slot in the upper surface.

3. A jig for a potter's wheel comprising a disc having a pin in the center and extended upwardly from the upper surface, an elongated slot in the upper surface and extended from the periphery of the disc towards the center, and a plurality of radially disposed slots positioned in the under surface and extended inwardly from the periphery, an L-shaped bracket having a flange extended upwardly from one end and having an elongated slot with beveled edges therein positioned in the slot in the upper surface of the disc, screws positioned in the slot of the bracket and threaded into the disc for clamping the bracket with the flange in adjusted positions in relation to the center, and a plurality of L-shaped clips having depending flanges on outer ends thereof and having slots with beveled edges in inner ends positioned in the radially disposed slots in the under surface of the disc, and screws positioned in the slots of the clips and threaded in the disc for clamping the clips in adjusted positions whereby the flanges on outer ends thereof are positioned against the peripheral surface of a potter's wheel upon which the disc is positioned.

4. In a jig for a potter's wheel, the combination which comprises a disc having a pin extended upwardly from the center with a slot in the upper surface extended from the periphery toward the center and with radially disposed slots in the under surface and extended inwardly from the periphery, a batt having an opening therein positioned over the pin of the disc and having a notch in the periphery, the batt being positioned on the disc, an L-shaped bracket slidably mounted in the slot in the upper surface of the disc and having an elongated slot therein, screws extended through the slot of the bracket and threaded in the disc for securing the flange on the outer end of the bracket in the notch of the batt, a potter's wheel upon which the jig is mounted, and L-shaped clips secured by screws in the radially disposed slots of the jig and having flanges on outer ends extended downwardly over the periphery of the potter's wheel.

5. In a jig for a potter's wheel, the combination which comprises a disc having L-shaped clips with depending flanges slidably mounted on the under surface and having a bracket with an upwardly extended flange on the outer end slidably mounted on the upper surface, and a pin positioned in the center of the disc and extended upwardly therefrom.

References Cited in the file of this patent

Kenny: The Complete Book of Pottery Making, Greenberg, New York, 1949, pages 35–43.